(12) United States Patent
Wahl et al.

(10) Patent No.: US 7,710,215 B2
(45) Date of Patent: May 4, 2010

(54) SEMICONDUCTOR CONFIGURATION HAVING AN INTEGRATED COUPLER AND METHOD FOR MANUFACTURING SUCH A SEMICONDUCTOR CONFIGURATION

(75) Inventors: Uwe Wahl, Munich (DE); Jens-Peer Stengl, Grafrath (DE)

(73) Assignee: Infineon Technologies Austria AG, Villach (AT)

( * ) Notice: Subject to any disclaimer, the term of this patent is extended or adjusted under 35 U.S.C. 154(b) by 124 days.

(21) Appl. No.: 12/025,170

(22) Filed: Feb. 4, 2008

(65) Prior Publication Data
US 2009/0195335 A1    Aug. 6, 2009

(51) Int. Cl.
*H01P 5/02*       (2006.01)
*H01P 3/08*       (2006.01)
(52) U.S. Cl. ..................................... 333/24 C; 333/238
(58) Field of Classification Search .................. 333/109, 333/110, 111, 112, 115, 116, 117, 118, 119, 333/120, 24 R, 24 C, 238
See application file for complete search history.

(56) References Cited

U.S. PATENT DOCUMENTS

| 5,892,411 | A   | * | 4/1999  | Schwan et al. ............ 333/24 R |
| 6,483,398 | B2  | * | 11/2002 | Nagamori et al. ........... 333/116 |
| 2004/0056749 | A1 |   | 3/2004  | Kahlmann et al. |
| 2005/0230837 | A1 |   | 10/2005 | Taghizadeh-Kaschani |

FOREIGN PATENT DOCUMENTS

DE          101 08 359 C1     9/2002

* cited by examiner

*Primary Examiner*—Dean O Takaoka
(74) *Attorney, Agent, or Firm*—Dickstein, Shapiro, LLP.

(57) ABSTRACT

A semiconductor configuration having an integrated coupler is provided. The semiconductor configuration includes a coupler which is integrated in the substrate and which includes a first port and a second port. The coupler defines, in a plan view onto the substrate, an inner region of the substrate surrounded at least in sections by the coupler, and an outer region of the substrate arranged outside to the coupler. The coupler is at least a magnetic coupler, a capacitive coupler, or a combination of both. At least a circuit element is integrated in the inner region of the substrate and includes a port which is electrically connected to the second port of the coupler.

24 Claims, 5 Drawing Sheets

SEMICONDUCTOR CONFIGURATION HAVING AN INTEGRATED COUPLER AND METHOD FOR MANUFACTURING SUCH A SEMICONDUCTOR CONFIGURATION

This description refers to embodiments of a semiconductor configuration having an integrated coupler and a method for manufacturing a semiconductor configuration having an integrated coupler.

BACKGROUND OF THE INVENTION

In many applications signals need to be transmitted between circuits operated at different electric potentials. The electric potential difference between the respective circuits can be up to several hundreds volts or even higher.

Commonly, level shifters have been used to transmit signals between circuits at different electric potentials. Level shifters include a switching element such as a MOS transistor, the breakdown voltage of which is above the electric potential difference between the circuits to generate a set pulse and a reset pulse. The pulses are generated by operating the switching element which causes a current pulse in the receiving circuit. The current pulse is detected, for example by detecting a voltage drop over a resistor in the receiving circuit.

The use of level shifters is limited to a frequency range of up to about 300 kHz or, if a silicon-on-insulator (SOI) substrate is used, of up to about 600 kHz due to inherent large dynamical parasitic capacitances.

Another option for signal transmission between circuits at different electric potentials is provided by coreless transformers which include coils arranged, for example, above each other and which are insulated from each other by an insulating material. Coreless transformers provide for a signal transmission in the MHz range.

BRIEF SUMMARY OF THE INVENTION

According to an embodiment, a semiconductor configuration having an integrated coupler is provided. The semiconductor configuration includes a coupler which is integrated in the substrate and which includes a first port and a second port. The coupler defines, in a plan view onto the substrate, an inner region of the substrate surrounded at least in sections by the coupler, and an outer region of the substrate arranged outside of the coupler. The coupler is at least a magnetic coupler, a capacitive coupler, or a combination of both. At least a circuit element is integrated in the inner region of the substrate and includes a port which is electrically connected to the second port of the coupler.

The coupler, which is together with the circuit element integrated in the substrate decouples the circuit element from other circuit elements to allow operation of the circuit element at a different electric potential. The coupler is arranged in a space-saving manner by forming it around the circuit element to which its second port is connected.

BRIEF DESCRIPTION OF THE SEVERAL VIEWS OF THE DRAWINGS

A full and enabling disclosure of the present invention, including the best mode thereof, to one of ordinary skill in the art, is set forth more particularly in the remainder of the specification, including reference to the accompanying figures. Therein.

DETAILED DESCRIPTION OF THE INVENTION

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appending claims. The drawings are not scaled and are for illustrative purposes only.

The term "lateral" as used in this specification intends to describe an orientation parallel to the main surface of a semiconductor substrate.

The term "vertical" as used in this specification intends to describe an orientation which is arranged perpendicular to the main surface of the semiconductor substrate.

Specific embodiments described in this specification pertain to, without being limited thereto, semiconductor configurations which include integrated circuits and particularly to semiconductor configurations having integrated circuits or circuit elements biased at different electric potentials.

Figure 1:
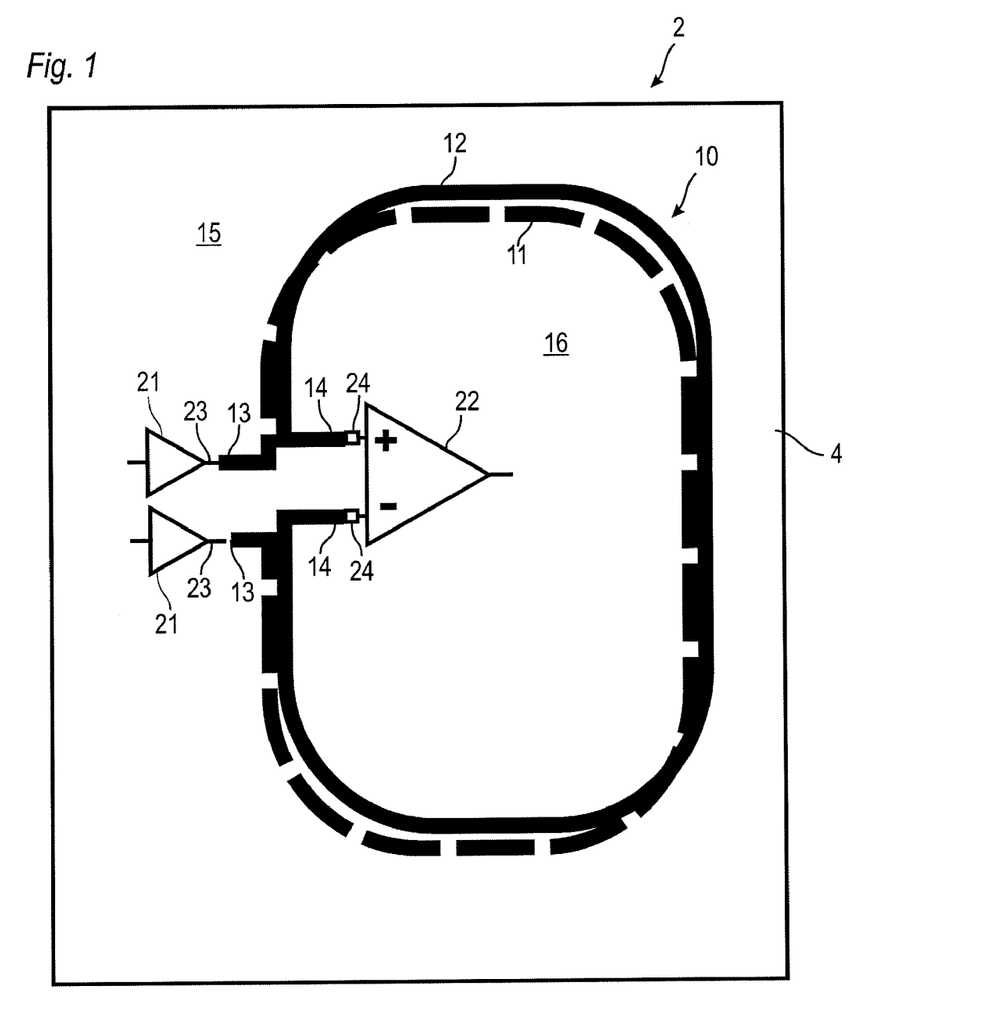
FIG. 1 shows a plan view on a semiconductor configuration according to an embodiment.

With reference to FIG. 1, a first embodiment of a semiconductor configuration is described. The semiconductor configuration 2 shown in a plan view in FIG. 1 includes a substrate 4. As it becomes more apparent from the description below, the substrate 4 can include at least a semiconductor substrate 6 and a metallization structure 8 formed on the semiconductor substrate 6.

Figure 8A:
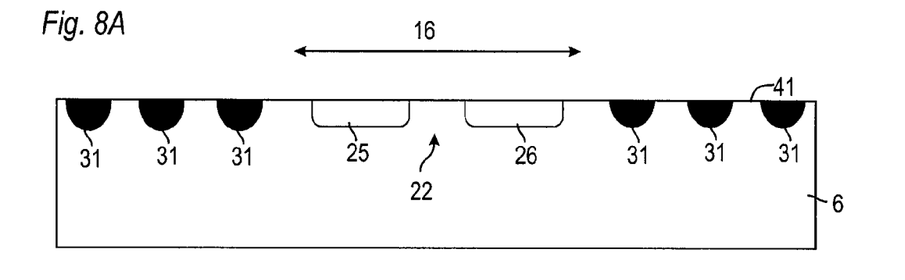
FIGS. 8A to 8E show steps of a manufacturing method according to an embodiment.

An integrated circuit 22 forming a circuit element is integrated in the substrate 4 and particularly in the semiconductor substrate 6 (see for example FIG. 8A). A skilled person will appreciate that an integrated circuit may include in addition to active and passive devices formed in the semiconductor substrate 6, electrical connections for interconnecting the devices. Such interconnections can be formed in the semiconductor substrate 6, for instance by doping regions. Additionally or alternatively, interconnections can be provided by the metallization structure 8 formed on the semiconductor substrate 6.

The integrated circuit 22 is represented in this embodiment, without being limited thereto, by an operational amplifier having two input terminals 24 which form a port of the integrated circuit 22. Typically, the integrated circuit 22 comprises at least one active amplifying element. In many applications, the integrated circuit 22 can be any type of amplifier such as a differential amplifier, a multistage amplifier or a power amplifier or any other type of integrated circuit.

The semiconductor configuration 2 as shown in FIG. 1 further includes another integrated circuit 21 forming a further circuit element. Output terminals 23 form a port of the integrated circuit 21. For the sake of simplicity, integrated circuit 21 is referred to as first integrated circuit while integrated circuit 22 is referred to as second integrated circuit. In many applications, first integrated circuit 21 is a transmitter or driver stage while second integrated circuit 22 is a receiver. A skilled person will appreciate that the first integrated circuit 21 can also be a receiver while the second integrated circuit 22 can be a transmitter. Similar to the second integrated circuit 22, first integrated circuit 21 can be embodied as any type of circuit element such amplifier or filter.

First and second integrated circuits 21, 22 are electrically insulated from each other and monolithically integrated in the substrate 4. As described in more detail below, the insulation can be provided by an insulation structure which separates the integrated circuits 21, 22 from each other. In many embodiments, first and second integrated circuits 21, 22 form together a common integrated circuit and are therefore parts of the common integrated circuit.

A coupler 10 is integrated in the substrate 4 and includes a first and a second conductor track 11, 12. Coupler 10 is typically also a part of the common integrated circuit. Each of the conductor tracks 11, 12 are formed like a winding and arranged above each other. In this description, "above each other" means disposed in a direction perpendicular to the lateral extension of the semiconductor substrate 6.

Typically, the windings are substantially planar and run parallel to the lateral extension of the substrate 4 and particularly parallel to the semiconductor substrate 6. In many applications, each of the conductor tracks 11, 12 has at least one winding. In FIG. 1, the conductor tracks are shown to be slightly laterally shifted to each other for clarity reasons only to facilitate illustration of the course of both conductor tracks. As it becomes apparent from FIG. 1, both conductor tracks 11, 12 run substantially parallel to each other. This increases the coupling between them.

In certain embodiments, each conductor track 11, 12 is formed by a respective single winding as shown in FIG. 1. A skilled person will appreciate that the conductor tracks 11, 12 can be formed by two or more windings to improve further the coupling.

The respective ends of the conductor tracks 11, 12 form the ports of the coupler 10. Depending on the desired type of coupling both ends of each track 11, 12 or only one end of each track 11, 12 form a respective port of the coupler 10. In the specific embodiment shown in FIG. 1, both ends of the first track 11 form the first port or input 13 of the coupler 10 while both ends of the second track 12 form the second port or output 14 of the coupler 10.

In the embodiment shown in FIG. 1, the coupler 10 provides an inductive coupling between the first and the second conductor track 11, 12. Specifically, the coupler 10 can be a coreless transformer which provides an inductive coupling for transmitting electrical signals. In other embodiments, a capacitive coupling can be provided by the conductor tracks 11, 12. The type of coupling is determined for instance by the electrical connection between the conductor tracks and the respective integrated circuits. In FIG. 1, the first conductor track 11 provides an electrically conductive connection between respective output terminals 23 of the integrated circuit 21. This allows a current to be flown through the first conductor track 11 which generates a magnetic field. The magnetic field induces a voltage in the second conductor track 12 which results in a current flow through the second conductor track 12 which connects both input terminals 24 of the second integrated circuit 22. When mainly a capacitive coupling is desired, the conductor tracks 11, 12 are used as capacitor electrodes and each conductor track 11, 12 is connected to a respective single terminal only. For inductive coupling particularly long conductor tracks are desired while for capacitive coupling a large area overlap between the conductor tracks are desired. This may influence the actual layout of the conductor tracks. A skilled person will appreciate that a capacitive coupling also includes a certain inductive coupling and vice versa since each segment of a conductor track has a given capacitance and an inductance. However, one coupling type is typically dominating.

Coupler 10 is capable of transmitting signals in the range of up to several Mhz. Furthermore, the monolithic integration of the coupler 10 into the same substrate reduces unwanted capacitances and inductances and thus increases the available bandwidth for transmitting electrical signals between the integrated circuit parts. In addition to that, the actual design of the coupler 10 can be varied to meet application demands such as electric strength and transmission bandwidth.

The coupler 10 is formed around the second integrated circuit 22 when viewed in a plan view onto the semiconductor substrate 6. This reduces the space required for the coupler 10. Typically, a coupler needs a given space irrespective if inductive or capacitive coupling is desired. By forming the coupler 10 around the second integrating circuit 22, only little extra space is assumed in comparison to cases where the coupler 10 is arranged laterally spaced to the second integrated circuit 12.

The coupler 10 defines, in a plan view onto the substrate 2, an inner region 16 arranged within the conductor tracks 11, 12 and an outer region 15 arranged external to the coupler 10. The first integrated circuit 21 is arranged in the outer region 15 while second integrated circuit 22 is arranged in the inner region 16. Typically, first and second conductor tracks 11, 12 of the coupler substantially completely surround the second integrated circuit 22. A small gap close to the ports of the coupler may remain as shown in FIG. 1 if each track comprises only one winding. In other embodiments, first and second tracks 11, 12 may also partially surround the second integrated circuit 22. Furthermore, different to the embodiment shown in FIG. 1, input 13 and output 14 of the coupler 10 can be arranged on different sides of the coupler 10 if desired.

As it becomes more apparent from FIGS. 2 to 7, inner region 16 is insulated from the outer region 15 by an insulation structure 30 integrated in the substrate 4. The insulation structure 30 substantially completely, and typically completely, surrounds the inner region 15, when viewed in a plan view onto the semiconductor substrate 6, and allows operation of the first and second integrated circuits 21, 22 at different electric potential. For example, the electric potential difference can be in the range of up to several hundreds volts. The insulation structure 30 should be therefore appropriately designed to insulate reliably the integrated circuits 21, 22 from each other. A signal transmission between the integrated circuits 21, 22 is provided by the coupler 10.

Figure 2:
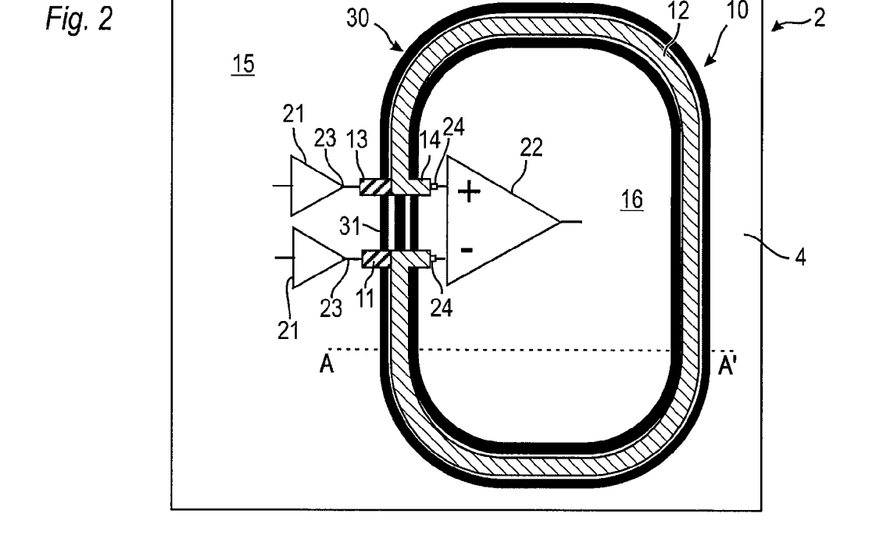
FIG. 2 shows a plan view on a semiconductor configuration according to another embodiment.

FIG. 2 shows a semiconductor configuration 2 with a coupler 10 arranged to provide inductive coupling between the first and second integrated circuits 21, 22. The coupler 10 is arranged above the insulation structure 30 which surrounds the inner region 16 in which the second integrated circuit 22 is formed. As shown in the plan view onto the semiconductor configuration 2, the course of the coupler 10 substantially follows the course of the insulation structure 30 which further reduces the space assumed by the coupler 10. More specifically, no extra space is required since the space above the insulation structure 30 is used to integrate the coupler 10. The integration density of the semiconductor configuration 2 can be therefore further increased.

With reference to FIGS. 3 to 7, various embodiments for the arrangement and design of the coupler 10 and the insulation structure are shown in respective cross-sections along the line AA' illustrated in FIG. 2.

The substrate 4 can include a semiconductor substrate 6 and a metallization structure 8 arranged on an upper or first surface 41 of the semiconductor substrate 6. The semiconductor substrate 6 can be made of silicon (Si), silicon carbide (SiC), a III-V semiconductor material or a heterojunction material, for instance a combination of Si and SiC. Furthermore, the semiconductor substrate 6 can include at least one epitaxial layer formed on a single-crystalline base material.

Typically, the insulation structure 30 is integrated in the semiconductor substrate 6. For example, the insulation structure 30 is formed by at least one doping region 31 arranged in the semiconductor substrate 6 at its upper surface 41. The doping region 31 surrounds the inner region 16 and is of opposite conductivity type to the conductivity type of the surrounding semiconductor substrate 6 so that pn-junctions are formed. Typically, the doping region 31 forms a closed ring around the inner region 16 and is allowed to float electrically. Such structures are also referred to as field rings. Depending on the electric potential difference between the inner and outer region 15, 16, at least one, at least two, at least three or more doping regions 31, each forming a respective closed ring structure, are provided. The doping regions or ring structures 31 are arranged substantially concentrically to each other. The spacing between adjacent ring structures 31 may vary. For example, the spacing between adjacent ring structures 31 increases from the inner to the outer region. In the embodiment shown in FIG. 3, the insulation structure 30 includes at least three doping regions 31 each of which is a formed like a closed ring structure. In other embodiments, partially open ring structures can also be used depending on specific needs.

Figure 3:
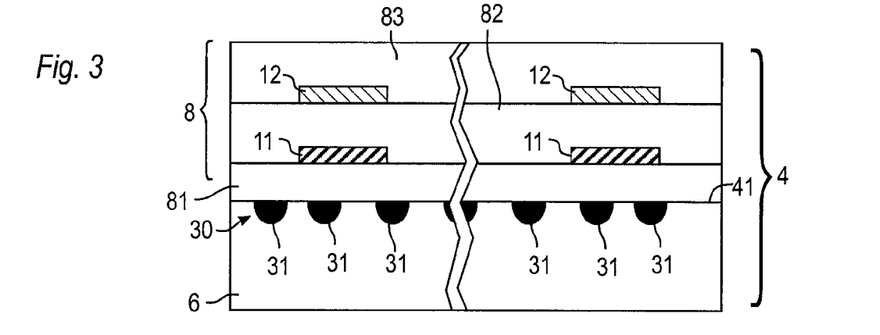
FIG. 3 shows a cross-section along line AA' in FIG. 2.

Typically, the ring structures 31 are insulated from each other by the surrounding oppositely doped semiconductor substrate 6. In other embodiments, the ring structures 31 can also be temporarily electrically connected with each other by at least one depletable doping region having the same conductivity type as the ring structures 31. When the inner and outer region 15, 16 are biased at different electric potentials, the depletable doping region are completely depleted and the ring structures 31 are therefore insulated from each other. If the electric potentials difference is reduced, for instances when switching off the semiconductor configuration 2, the depletable region becomes conductive and allow a flow of charge carriers which were trapped in the ring structures 31.

In addition to the doping regions 31, which can be, depending on the conductivity type of the semiconductor substrate 6, n-doped or p-doped, field plates can be provided which can be arranged on the semiconductor substrate 6 and in electrical connection with the doping regions 31. It would also be possible to form the doping regions 31 as compensation structures integrated in the semiconductor substrate 6. Compensation structures are typically column-shaped doping regions of opposite conductivity type to the semiconductor substrate 6. Other possible shapes are strips or separate layers. It would also be possible to form doping regions of varying lateral doping (VLD) and use them as ring structures.

In the embodiment shown in FIG. 3, the first and second conductor tracks 11, 12 are integrated in two different levels of the metallization structure 8. Particularly, the first conductor track is integrated in a first level while the second conductor track is integrated in a second level. First and second conductor tracks 11, 12, and in more general terms first and second metallization levels, are insulated from each other by a second insulation layer 82. A first insulation layer 81 is used to insulate the first conductor track 11, and in more general terms the first level of the metallization structure 8, from the semiconductor substrate 6. The thickness of the second insulation layer 82 can be adapted to withstand the electric potential difference occurring between the first conductor track 11 and the second conductor track 12. It should be reminded here that the first conductor track 11 is at the electric potential of the first integrated circuit 21 while the second conductor track 12 is at the electric potential of the second integrated circuit 22. A third insulation layer 83 can be used to cover the second conductor track 12.

Figure 4:
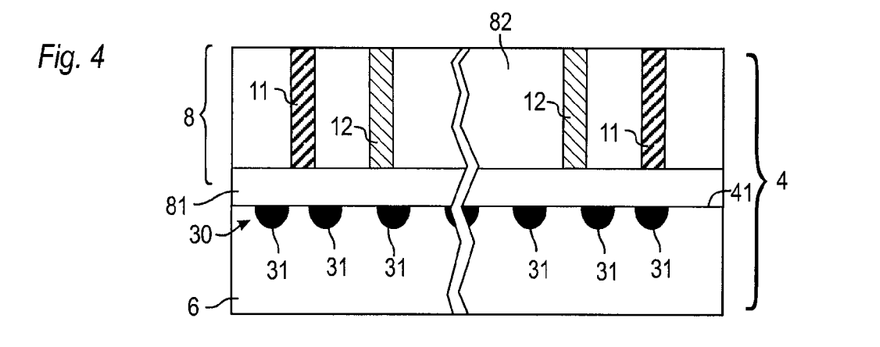
FIG. 4 shows a cross-section along line AA' in FIG. 2 according to a further embodiment.

FIG. 4 shows an embodiment where the first and second conductor tracks 11, 12 are integrated in a common metallization level of the metallization structure 8. More specifically, the conductor tracks 11, 12 are arranged in trenches formed in the second insulation layer 82. The trenches can have a vertical extension of about 2 μm or more to increase the coupling between them. The lateral spacing between the first and second conductor tracks 11, 12 is again mainly defined by the electric potential difference between the conductor tracks 11, 12 and the material of the second insulation layer 82. Typically, the second conductor track 12, which is electrically connected to the second integrated circuit 22 arranged in the inner region 16 of the substrate 4, is surrounded by the first conductor track 11.

Figure 5:
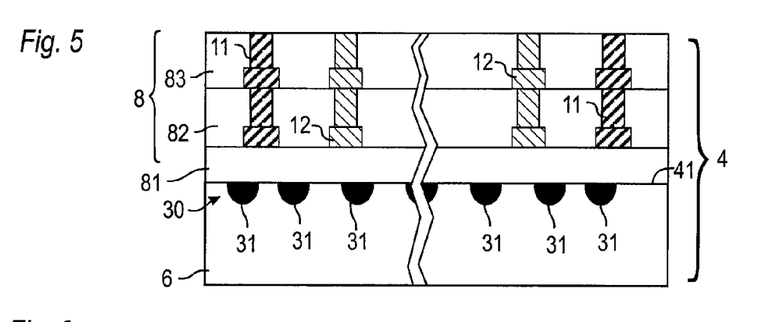
FIG. 5 shows a cross-section along line AA' in FIG. 2 according to a yet further embodiment.

Different to the embodiment shown in FIG. 4, the first and second conductor tracks 11, 12 could also be formed commonly in two or more metallization levels. An exemplified embodiment is shown in FIG. 5 where each conductor track 11, 12 extend over at least two metallization levels. This allows the conductor tracks 11, 12 to be formed in a significant large vertical extension without increasing the topology of the semiconductor configuration 2. Vias formed between adjacent metallization levels are also used to form the conductor tracks 11, 12. FIG. 5 shows that each conductor tracks 11, 12 are formed by a combination of two tracks formed in adjacent metallization levels and vias which provides an electrical connection between the tracks of the adjacent metallization levels.

Using two or more metallization levels also allows the formation of two or more windings for each conductor track 11, 12 which would increase the coupling between the conductor tracks 11, 12. This applies to both inductive and capacitive coupling.

Figure 6:
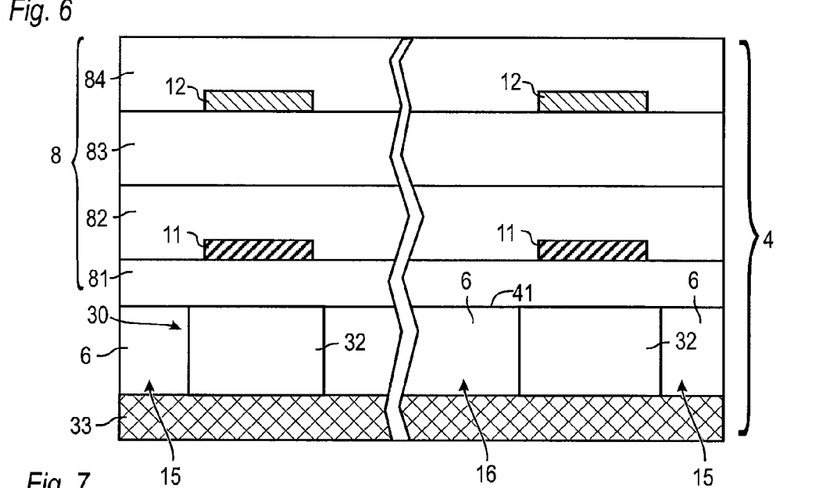
FIG. 6 shows a cross-section along line AA' in FIG. 2 according to another embodiment.

With reference to FIG. 6 a further embodiment is described which includes an insulation structure 30 having trenches 32 formed in the semiconductor substrate 6. The trenches 32 are filled with an insulating material such as an oxide. In many applications, silicon oxide is used but it would also be possible to use other insulating materials such as nitrides. A backside insulation layer 33 provides insulation on the lower side of the semiconductor substrate 6 so that the inner region 16 is completely insulated from the outer region 16 of the semiconductor substrate 6 by the insulation trenches 32 and the backside insulation layer 33. In the cross-section shown in FIG. 6, two insulation trenches 32 are shown. When viewing the semiconductor configuration 2 in a plan view onto the substrate 4 it becomes apparent that only one ring-like insulation trench 32 is arranged in the semiconductor substrate 6 which completely surrounds the inner region 16.

The semiconductor configuration 2 can be integrated in a SOI-substrate, an example of which is shown in FIG. 6. The backside insulation layer 33 can be in this case an oxidation layer at which two semiconductor substrates are bonded.

SOI-substrates, due to their improved insulation, allow the application of very high electric potential differences between the respective integrated circuits 21, 22 and reduce parasitic capacitances and inductances.

The coupler 10 of the embodiment shown in FIG. 6 includes conductor tracks 11, 12 which are formed in a first and a third metallization level of the metallization structure 8. Therefore, the first and second conductor tracks 11, 12 are insulated from each other by the second and third insulation layer 82, 83 while a fourth insulation layer 84 covers the second conductor track 12. This increases the distance between the conductor tracks 11, 12 and is useful for semiconductor configurations 2 having two integrated circuits 21, 22 operated at a very high electric potentials difference. If desired, the second conductor track 12 could also be formed in a fourth metallization level to further improve the insulation between the conductor tracks 11, 12. Furthermore, stray capacitances and inductances can be reduced.

Irrespective of the actual design of the insulation structure 30, the lateral extension of the insulation structure is sufficient to accommodate the coupler 10 above the insulation structure 30 without using extra space. For example, in many embodiments, a lateral space between the first and second integrated circuits 21, 22 of about 10 to 15 μm per 100 V insulation voltage is used, which gives a lateral extension of the insulation structure 30 between the first and second integrated circuit 21, 22 of roughly the same dimension. When the first and second integrated circuits 21, 22 operate at an electric potential difference of about 500 V the spacing, and therefore the lateral extension of the insulation structure 30 between the integrated circuits 21, 22, is roughly between 50 and 75 μm.

Figure 7:
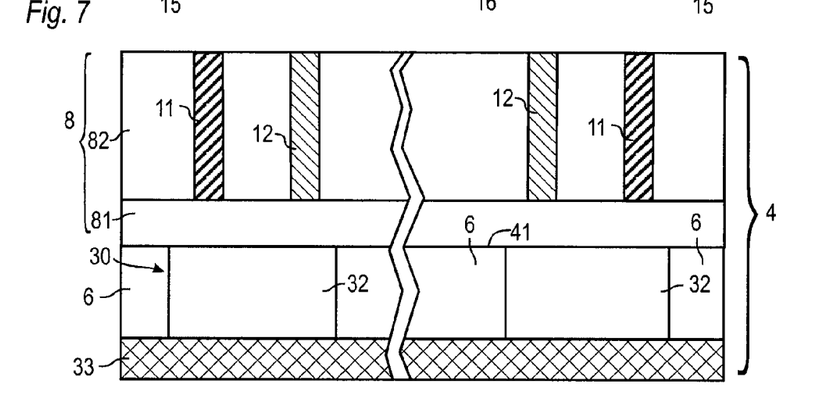
FIG. 7 shows a cross-section along line AA' in FIG. 2 according to yet another embodiment.

FIG. 7 shows a combination of the insulation structure used in the embodiment shown in FIG. 6 and the coupler of the embodiment shown in FIG. 4.

In all embodiments, the conductor tracks 11, 12 can be made of a metal or a metal alloy. Typical examples, without being limited thereto, are aluminium, aluminium alloys, copper, copper alloys and metal silicides. The conductor tracks 11, 12 can also include barrier layers or contact layers. Barrier layers are often used to avoid diffusion of the metal into adjacent regions, for example into the insulation layers. Contact layers are often used to reduce the contact resistance between different materials.

The above described embodiments are monolithically integrated semiconductor configurations having the first and second integrated circuit 21, 22, the coupler 10 and the insulation structure 30 integrated in the same substrate. Particularly, the integrated circuits 21, 22 and the insulation structure 30 are monolithically integrated at least partially in the semiconductor substrate 6. It would also be possible if only the second integrated circuit 22 would be monolithically integrated together with the coupler 10 and the insulation structure 30 in the substrate 4. In this case, contact pads can be arranged on the substrate 4 which are electrically connected to the first conductor track 11. The contact pads are then arranged in the outer region 15 and electrically insulated from the second integrated circuit 22 arranged in the inner region 16. In this case, the semiconductor configuration 2 would include only one integrated circuit arranged in the inner region 16. An electrical signal biased at an electric potential significantly different to the electric potential of the integrated circuit in the inner region 16 can then be fed to the contact pads.

With reference to FIGS. 8A to AE a method for manufacturing a semiconductor configuration will be described. As shown in FIG. 8A an insulation structure 30 having multiple doping regions 31 is arranged in and at the upper surface 41 of the semiconductor substrate 6. However, the method is not restricted to this type of insulation structure. For sake of simplicity, a MOS-FET having a source region 25 and a gate region 26 integrated in the semiconductor substrate 6 represents the second integrated circuit 22 arranged in the inner region 16 of the semiconductor substrate 6. A skilled person will appreciate that the second integrated circuit 22 may include further active and passive devices and interconnections.

Although not shown in FIG. 8A, a first integrated circuit 21 can be integrated in the not shown outer region 15 of the semiconductor substrate 6.

Figure 8B:
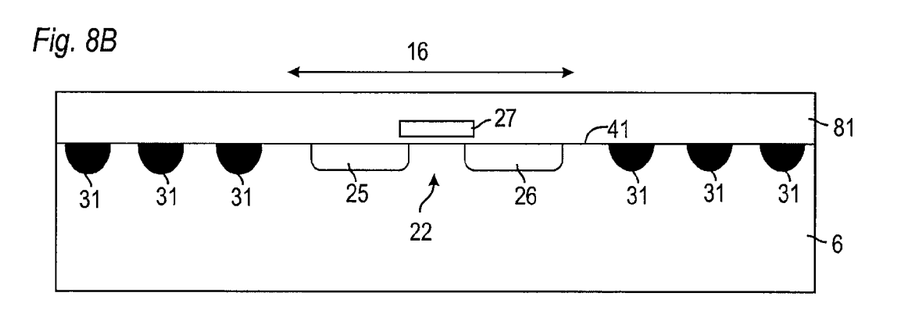

For completing the MOS-FET a gate electrode 27 is formed on the semiconductor substrate 6. Gate electrode 27 is insulated from the semiconductor substrate 6 by a gate insulation layer. A first insulation layer 81 is formed on the gate electrode 27 and the upper surface 41 of the semiconductor substrate 6. First insulation layer 81 can be for instance an oxide. The resulting structure is shown in FIG. 8B.

Then, the first conductor track 11 is formed by depositing and structuring a metal layer. For example, aluminium or an aluminium alloy can be used. Additional barrier and contact layers may also be formed prior to or after the deposition of the metal layer. Interconnections for the second integrated circuit 22 can also be formed by the structured metal layer. It should be noted here that interconnections for the first integrated circuit 21 can also be formed if desired. Furthermore, a connection between the first integrated circuit and first conductor track 11 will be formed. The structured first metal layer defines a first metallization level.

Figure 8C:
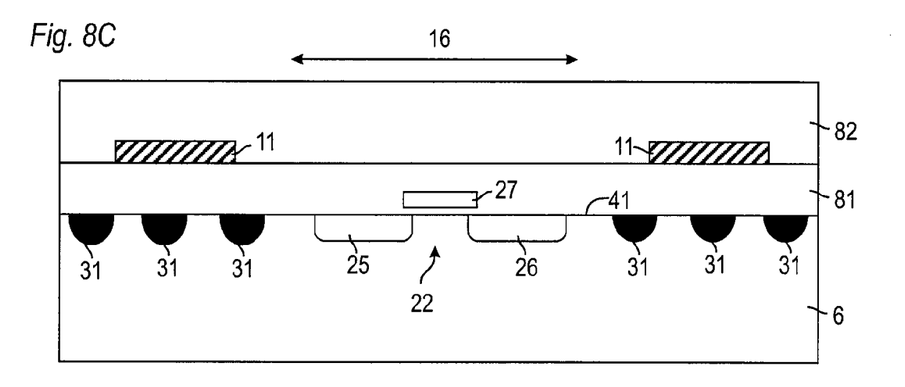

The formed first conductor track 11 is covered by a second insulation layer 82 as shown in FIG. 8C in which openings can be formed which are subsequently filled with metal or metal alloy. Such metal-filled openings are referred to as vias and are used to provide electrical connections between the first metallization level and the subsequently formed second metallization level.

Figure 8D:
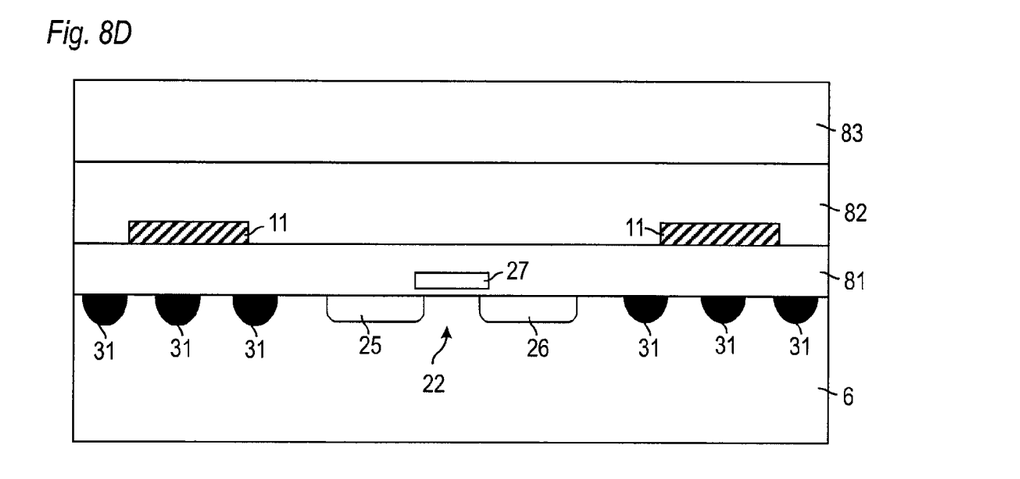

In this embodiment, a third insulation layer 83 is deposited on the second insulation layer 82 as shown in FIG. 8D. The third insulation layer 83 covers a second metal layer which is not shown here. The second metal layer defines the second metallization layer which is used in regions other than the region of the coupler 10 to form interconnections for the first and second integrated circuit 21, 22. In case that more than one winding per conductor track 11, 12 is desired, the second metal layer can also be used to form portions of the respective conductor tracks 11, 12. Again, vias can be formed in the third insulation layer 83 for providing electrical connections between the second and a subsequently formed third metallization level. The vias are typically formed in the inner and outer regions 15, 16 as part of local interconnections for the respective integrated circuits 21, 22. In the region of the coupler 10, typically no vias are formed between the first and the second conductor tracks 11, 12 to keep them electrically insulated from each other. If the conductor tracks 11, 12 have more than one winding, vias are formed to connect the respective windings of the respective conductor track 11, 12.

Figure 8E:
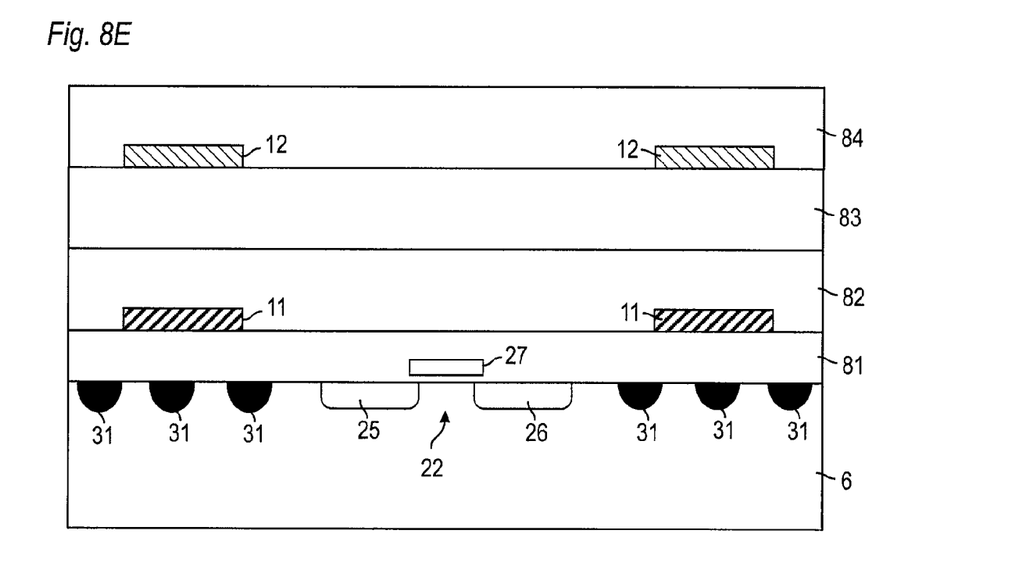

On the third insulation layer 83 a third metal layer is deposited and structured to form the second conductor track 12 as shown in FIG. 8E. Structured third metal layer defines the third metallization level. The third metal layer can be used to form interconnections of the first and second integrated circuits 21, 22.

Finally, a fourth insulation layer 84 is deposited to cover the third metallization level and the second conductor track 12. Electrical connections between the second conductor track 12 and the second integrated circuit 22 can also be provided by appropriate interconnections formed in the respective metallization levels.

Second, third and fourth insulation layers 82, 83 and 84 are sometimes referred to as inter metal dielectric layers (ILDs).

A skilled person will appreciate that only two metallization levels can be used and that the second conductor track 12 is than formed in the second metallization level. It would also be possible to form the first conductor track 11 in the second metallization level and the second conductor track 12 in the first metallization level. Furthermore, the first conductor track 11 can be formed in the second metallization level while the second conductor track 12 can be formed in the third metallization level. Alternatively, four metallization levels can be used with the second conductor track 12 being formed in the fourth metallization level.

The semiconductor configuration as described herein can be used in monolithically integrated high-voltage circuits having integrated circuit portions operating at different electric potentials. Furthermore, for insulating the circuit portions, an insulation structure can be integrated which substantially completely surrounds one integrated circuit portions to insulate it from another integrated circuit portion arranged in a region outside to the insulation structure. Signal transmission between both integrated circuit portions is provided by a coupler formed on the insulation structure. The coupler can include at least two conductor tracks insulated from each other each which substantially follow the course of the insulation structure.

The written description above uses specific embodiments to disclose the invention, including the best mode, and also to enable any person skilled in the art to make and use the invention. While the invention has been described in terms of various specific embodiments, those skilled in the art will recognise that the invention can be practiced with modifications within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A semiconductor configuration, comprising:
   a substrate;
   a coupler integrated in the substrate and comprising a first port and a second port, the coupler defining, in a plan view onto the substrate, an inner region of the substrate surrounded at least in sections by the coupler, and an outer region of the substrate arranged outside to the coupler, the coupler being at least one of a magnetic coupler, a capacitive coupler, and a combination of both; and
   at least a circuit element integrated in the inner region of the substrate, the circuit element comprising a port being electrically connected to the second port of the coupler.

2. The semiconductor device of claim 1, wherein the coupler comprises a first and a second conductor track integrated in the substrate, the first and second conductor tracks being electrically insulated from, and running at least in sections parallel to each other, the first conductor track being electrically connected to the first port of the coupler and the second conductor track being electrically connected to the second port of the coupler.

3. The semiconductor device of claim 2, wherein each of the first and second conductor tracks comprises at least a substantially planar winding.

4. The semiconductor configuration of claim 1, further comprising an insulation structure integrated in the substrate, the insulation structure surrounding, in the plan view onto the substrate, the circuit element.

5. The semiconductor configuration of claim 2, further comprising an insulation structure integrated in the substrate, the insulation structure surrounding, in the plan view onto the substrate, the circuit element, the first and second conductor tracks of the coupler running on and along the insulation structure.

6. The semiconductor configuration of claim 4, wherein the substrate comprises a semiconductor substrate, the insulation structure being integrated in the semiconductor substrate.

7. The semiconductor configuration of claim 6, wherein the insulation structure comprises at least one field ring integrated in the semiconductor substrate.

8. The semiconductor configuration of claim 6, wherein the insulation structure comprises a trench integrated in the semiconductor substrate, the trench being filled with an insulating material.

9. The semiconductor configuration of claim 1, further comprising at least a further circuit element integrated in the outer region of the substrate, the further circuit element being electrically connected to the first port of the coupler.

10. The semiconductor configuration of claim 9, further comprising an insulation structure integrated in the substrate, the insulation structure electrically insulating the circuit elements from each other.

11. The semiconductor configuration of claim 2, further comprising a metallization structure comprising at least two metallization levels arranged above each other, wherein each of the first and second conductor tracks is arranged in a respective metallization level.

12. The semiconductor configuration of claim 2, further comprising a metallization structure comprising a first metallization level, a second metallization level, and a third metallization level arranged in this order above each other, wherein the first and second conductor tracks are arranged at least in the first and the third metallization level, respectively.

13. The semiconductor configuration of claim 2, further comprising a metallization structure comprising at least one metallization level, the first and second conductor tracks being arranged laterally spaced to each other in the same metallization level.

14. A semiconductor configuration, comprising:
    a substrate;
    a coupler means comprising a first and a second conductor means integrated in the substrate, the coupler means defining, in a plan view onto the substrate, an inner region of the substrate surrounded at least in sections by the first and second conductor means, and an outer region of the substrate arranged outside of the first and second conductor means, the coupler means being at least one of a magnetic coupler means, a capacitive coupler means, and a combination of both; and
    at least a circuit element integrated in the inner region of the substrate, the circuit element comprising a port being electrically connected to the second conductor means.

15. The semiconductor configuration of claim 14, wherein the first and second conductor means running at least in sections parallel to, and being electrically insulated from each other.

16. The semiconductor configuration of claim 14, further comprising a further circuit element arranged in the outer region of the substrate, the further circuit element being electrically connected to first conductor means.

17. The semiconductor configuration of claim 16, further comprising an insulation means integrated in the substrate, the insulation means electrically insulating the circuit elements from each other, the first and second conductor means being arranged on and running substantially along the insulation means.

18. A semiconductor configuration, comprising:
a substrate;
at least a first and a second integrated circuit integrated in the substrate;
an insulation structure for electrically insulating the first integrated circuit form the second integrated circuit, the insulation structure being integrated in the substrate and surrounding, in a plan view onto the substrate, at least partially the second integrated circuit; and
a coupler integrated in the substrate, the coupler comprising a first port and a second port, the first port being electrically connected to the first integrated circuit and the second port being electrically connected to the second integrated circuit, the coupler being at least one of a magnetic coupler, a capacitive coupler, and a combination of both.

19. A method for manufacturing a semiconductor configuration, comprising:
providing a substrate;
integrating at least a circuit element comprising a port in the substrate;
integrating a coupler comprising a first and a second port in the substrate so that the coupler surrounding, in a plan view onto the substrate, at least in sections the circuit element; and
forming an electrical connection between the port of the circuit element and the second port of the coupler.

20. The method of claim 19, wherein the step of integrating the coupler comprises:
forming a first and a second conductor track; and
forming at least an insulation layer between the first and second conductor tracks for electrically insulating the conductor tracks from each other, wherein the first and second conductor tracks run at least in sections parallel to each other;
wherein the first conductor track is electrically connected to the first port and the second conductor track is electrically connected to the second port of the coupler.

21. The method of claim 19, further comprising integrating a further circuit element in the substrate outside to the coupler, and providing an electrical connection between the further circuit element and the first port of the coupler.

22. The method of claim 21, further comprising integrating an insulation structure in the substrate to electrically insulate the circuit elements from each other.

23. The method of claim 19, wherein the substrate comprises a semiconductor substrate and wherein the coupler is integrated in a metallization structure formed on the semiconductor substrate.

24. A method for transmitting an electrical signal between a first and second integrated circuit portion, comprising:
providing a first and a second integrated circuit portion which are insulated from each other by an insulation structure, the insulation structure laterally surrounding the second integrated circuit portion;
providing a coupler comprising a first and a second conductor track, the first conductor track being electrically connected to the first integrated circuit portion and the second conductor track being electrically connected to the second integrated circuit portion, and the first and second conductor tracks being insulated from each other and running, at least in sections on and parallel to the course of the insulation structure; and
transmitting a signal from the first to the second integrated circuit portion by at least one of magnetic and capacitive coupling between the first and second conductor tracks.

* * * * *

UNITED STATES PATENT AND TRADEMARK OFFICE
CERTIFICATE OF CORRECTION

| | | |
|---|---|---|
| PATENT NO. | : 7,710,215 B2 | Page 1 of 1 |
| APPLICATION NO. | : 12/025170 | |
| DATED | : May 4, 2010 | |
| INVENTOR(S) | : Uwe Wahl et al. | |

It is certified that error appears in the above-identified patent and that said Letters Patent is hereby corrected as shown below:

In the Cover Page

(56) Under FOREIGN PATENT DOCUMENTS, please delete "101 08 359" and insert -- 101 06 359 --, therefor.

Signed and Sealed this
Fourth Day of January, 2011

David J. Kappos
*Director of the United States Patent and Trademark Office*